April 16, 1963 H. G. WOTEN ET AL 3,085,834
MATERIAL SPRAYING APPARATUS
Filed March 15, 1961 2 Sheets-Sheet 1

INVENTORS
*Homer G. Woten &*
*Earl F. Sommers*

BY *Mason, Fenwick & Lawrence*
ATTORNEYS

April 16, 1963 H. G. WOTEN ET AL 3,085,834
MATERIAL SPRAYING APPARATUS
Filed March 15, 1961 2 Sheets-Sheet 2
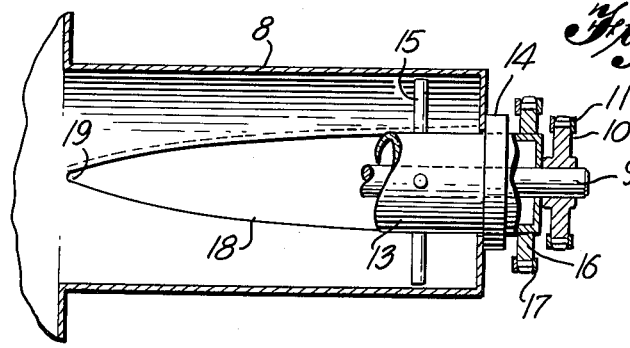
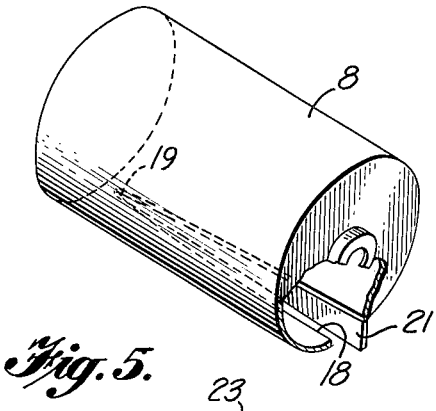
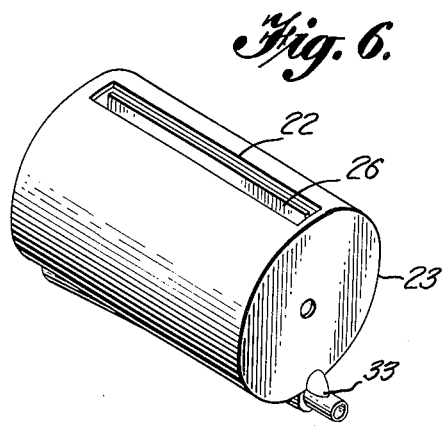
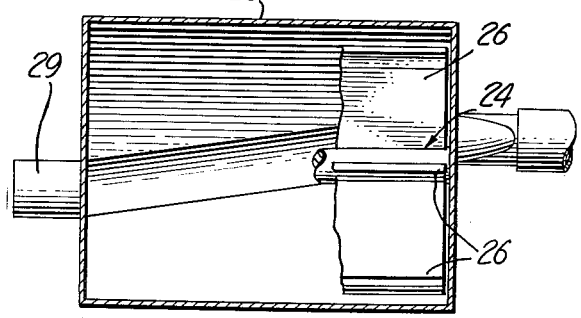
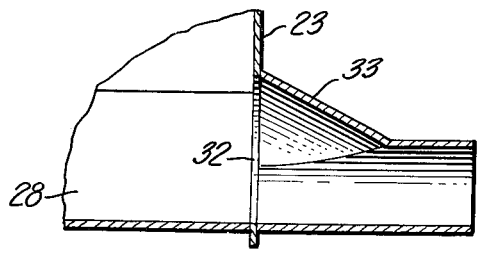
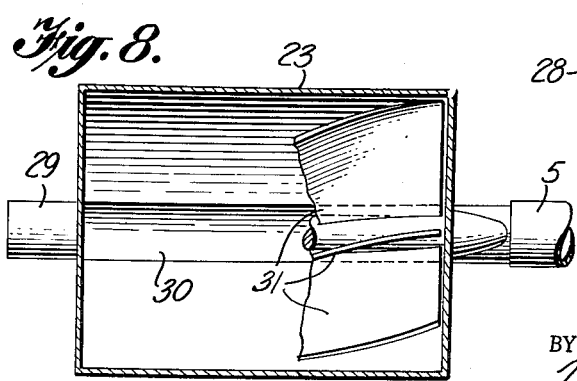
INVENTORS
*Homer G. Woten &
Earl F. Sommers*
BY
*Mason, Fenwick & Lawrence*
ATTORNEYS

United States Patent Office 3,085,834
Patented Apr. 16, 1963

3,085,834
MATERIAL SPRAYING APPARATUS
Homer G. Woten, 1890 15th Court NW., and Earl F. Sommers, 500 Cypress Garden Road, both of Winter Haven, Fla.
Filed Mar. 15, 1961, Ser. No. 95,878
8 Claims. (Cl. 302—49)

This invention relates to material handling apparatus for use in connection with machines for conveying and spraying fiber materials, such as rock wool insulation, and particularly to such apparatus for shredding and meter-feeding the material. Although fiber material is mentioned herein, it will be understood that the apparatus can handle granular and powdered material as well.

Machines have been developed for spraying fibrous insulating material into building walls and other desired places which machines shred and feed the material to be fed into a conveying stream of air. Some difficulty has been encountered, however, in feeding the material at a uniform rate to the air stream so that a continuous and constant delivery from the air line may be obtained. Due to the use of air valves, direction changes in the feed path, and other impediments inherent in previous structures, the feed has been more or less intermittent and difficult to control efficiently.

The general object of the present invention is to provide mechanism for shredding and feeding fibrous material which will assure a constant metered flow of material to the air line.

A more specific object of the invention is to provide mechanism of this kind wherein the conveying and shredding apparatus is of novel arrangement to provide a more perfect result.

A further object of the invention is to provide means to insure a uniform flow of material over the full width of the outlet from the shredding to the feeding chambers.

Another object is the provision of means to provide a feed of the air lock type, wherein the outflow is continuous rather than successive charge deposits as with conventional feeders.

A still further object of the invention is to provide means to permit smooth, non-turbulent pick-up of material from the feeder, including material floating high in the feed chambers and smooth reduction of the material-laden air stream from the cross-section of the feed chambers to the cross-section of the discharge hose.

Other objects of the invention will become apparent from the following description of practical embodiments thereof, when taken in conjunction with the drawings which accompany, and form part of, this specification.

In the drawings:

FIGURE 3 is a horizontal section through the shredder taken on the line 3—3 of FIGURE 1;

FIGURE 4 is a perspective view of the casing of the shredder portion of the machine;

FIGURE 5 is a horizontal section through the air valve feeder taken on the line 5—5 of FIGURE 1;

FIGURE 6 is a perspective view of the air valve;

FIGURE 7 is a fragmentary vertical section through the outlet end of the air valve; and FIGURE 8 is a view similar to FIGURE 5, showing a slightly modified arrangement of the air valve.

Figure 1:
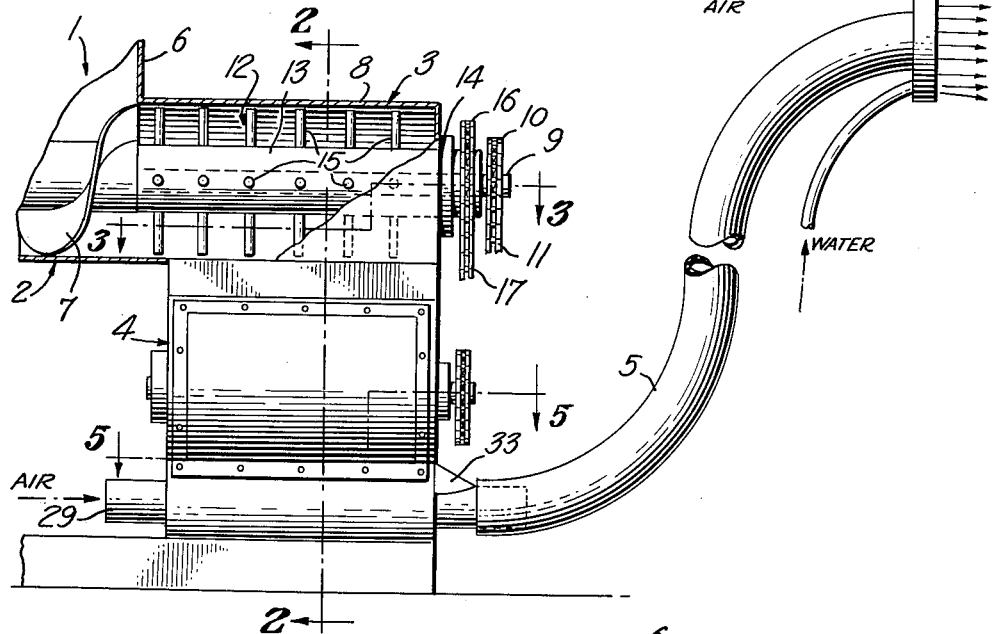
FIGURE 1 is a side elevation with parts in vertical section of a portion of an insulation shredding and feeding machine, a part of the shredder feed, and the entire shredding and feeding mechanism being shown.
Figure 2:
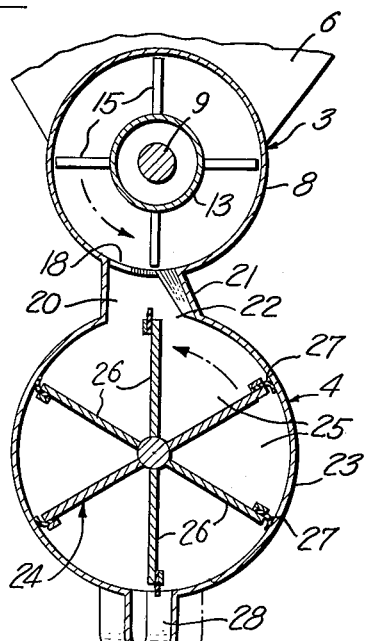
FIGURE 2 is a transverse vertical section through the shredder and air valve feeder, and is taken on the line 2—2 of FIGURE 1.

Referring to the drawings, a portion of an insulation spraying machine is shown at 1. The machine consists essentially of a fiber conveying means 2, a shredder 3, an air valve feeder 4, and a spraying hose 5.

The conveying means 2 can include any conventional hopper 6 with a screw conveyor 7 mounted in the bottom to move material horizontally out of the hopper. The screw is approximately the diameter of the shredder casing 8 and is in longitudinal alignment with it. The screw terminates at the shredder inlet. Conveyor 7 is fixedly mounted upon a shaft 9, which projects through the shredder casing and carries a sprocket 10 on its end which projects beyond the shredder. The sprocket will be driven by a chain 11 from any suitable source of power. The screw will form means to move fiber into the shredder at a continuous rate.

The shredder mechanism consists of the casing 8, which is cylindrical and has an open end in communication with the fiber hopper and its outer end closed, and a rotor 12. The rotor has a hollow shaft 13 rotatably mounted on the shaft 9 of the screw conveyor and journalled in a boss 14 carried by the closed end of the shredder casing. The rotor carries a plurality of radially extending shredding arms, or pins, 15. Hollow shaft 13 has a sprocket 16 fixed to its end, and is driven by a chain 17 from any convenient source of power. It will be apparent that the rotating arms 15, moving across the stream of fiber fed by the conveyor, will break up the fiber.

It is important that fiber be fed to the shredder casing across the full length of the casing if full benefit of the entire rotor and maximum shredding efficiency are to be obtained. At the same time, it is important that shredded fiber be fed to the underlying air valve at a substantially even rate throughout its full length. To accomplish these purposes, the bottom of the shredder casing is provided with an outlet 18 which extends the length of the casing. The outlet opening is tapered, being substantially V-shaped, with the tip 19 of the V being located at the entrance to the shredder and the outlet sides diverging toward the casing closed end. Thus, the outlet is restricted at the entrance to the shredder so that part of the conveyed fiber will be carried along the shredder casing. The outlet becomes increasingly larger, however, so that as the conveying pressure and fiber volume become less, the outlet becomes greater. Under these conditions, some fiber will be moved completely across the shredder casing and fiber will flow out substantially uniformly along the full length of the outlet.

It will be apparent that the shredder rotor will cause the fiber moving longitudinally of the shredder to change its direction and assume a rotary movement. Thus, as it leaves the shredder through the outlet 18 it will have an impetus tangentially to the shredder casing. In order to prevent undue turbulence which would otherwise occur when the material strikes the far side of the passage 20 connecting the shredder and air valve 4, the wall 21 of the passage follows the contour of the outlet 18 and declines away from the outlet. This provides a sloping baffle, or wall, slanting in the direction of the inflowing material to gently direct the flow of incoming material from its tangential path to a downwardly directed one for entrance into the air valve. The angle of the baffle 21 varies from end to end, as its top edge follows the contour of the shredder outlet 18 while its lower edge conforms to the straight side of the rectangular air valve inlet 22. This will lead the material smoothly into the air valve.

The air valve also has a cylindrical casing 23, and the inlet 22 is arranged along its top. The air valve cylinder is directly beneath the shredder. The valve is of the general type having a vaned rotor 24 with chambers 25 formed between the vanes 26. The vanes have sealing lips 27 for engagement with the internal walls of the casing, and rotation of the rotor will bring the several chambers into registry first with the inlet 22 and then with the outlet trough 28 in communication with the air line 29 and hose 5. The vanes seal off the chambers intermediate the inlet and outlet and provide an air lock to prevent air under pressure in the outlet trough from flowing into the machine.

The conventional air feeder of the vane type empties its chambers into the outlet trough in succession, but there is an interval between discharges due to the successive movements of the chambers. In the present valve, however, the trough 28 is positioned at an angle to the longitudinal axis of the valve so that the chambers empty progressively from end to end into the trough, and as one chamber is finishing its discharge into one end of the trough, the next chamber is already in communication with the trough at the other end and is beginning its discharge. This will provide for continuity of discharge and uniformity of feed into the trough. The same result can be obtained by the structure shown in FIGURE 8, wherein the outlet trough 30 is positioned parallel to the longitudinal axis of the valve and the vanes 31 of the rotor are spiralled. This is just the reverse of the first-described structure, but the same continuous, progressive discharge will be had.

Frequently, material will float high in the trough 28, or possibly be caught in the air stream while in the valve chamber. If smooth flow from the trough into the hose is to be attained, it is necessary that the material move out of the valve casing into the hose without striking the casing end wall and wihout turbulence in that area. To this end, the outlet orifice 32 from the casing is vertically elongated by the provision of a cap section 33. The cap tapers downward to draw in the material stream to the cross-section of the spray hose 5.

It will be seen from the above that material flow from the hopper into the spray hose will be both smooth and uniform, and that a continuous stream of sprayed fiber will be provided. In view of the detailed description of the function of the various parts, it is not thought that a review of the complete operation is necessary.

While practical embodiments of the invention have been disclosed, it will be understood that the details of construction shown and described are merely by way of illustration, and the invention may take other forms within the scope of the appended claims.

What is claimed is:

1. Material spraying apparatus of the type wherein a shredder is fed from a hopper and is superimposed over an air valve feeder, the improvement which comprises, the shredder having a cylindrical, horizontally positioned casing, an outlet extending the length of the bottom of the shredder casing permitting flow of material from the shredder casing to the underlying air valve, a rotor having a hollow shaft and shredder arms rotatably mounted in the casing, a screw feed conveyor axially aligned with the shredder casing and hollow rotor shaft, a drive shaft fixed to and projecting axially from the screw conveyor and projecting through the hollow rotor shaft, said hollow rotor shaft and screw conveyor shaft projecting beyond the end of the shredder casing, and means connected to the respective shafts beyond the shredder casing to independently drive the shafts.

2. Material spraying apparatus as claimed in claim 1, wherein the outlet is a horizontal opening parallel to the shredder shaft and having sides diverging progressively from a narrow end adjacent the screw conveyor.

3. Material spraying apparatus as claimed in claim 2 wherein there is a baffle depending along the far side of the outlet opening in the direction of rotor rotation against which material acted upon by the rotor will be thrown, the baffle declining outwardly from the opening edge to smoothly change the direction of material movement to direct the material downwardly into the air valve.

4. Material spraying apparatus as claimed in claim 3 wherein the air valve includes a cylindrical casing vertically aligned with the shredder casing and a vaned rotor rotatably mounted therein, a delivery trough along the full length of the air valve casing at the bottom in communication with the air valve casing interior and open at the ends, a source of air under pressure coupled to one end of the trough and a spray hose connected to the other end of the trough, the trough and the vanes of the rotor being angularly related to cause progressive traversing movement of the trough from end to end by the vanes when the vaned rotor is rotated.

5. A shredder and a feeder therefor comprising, a hopper, a screw conveyor in the bottom of the hopper, a cylindrical shredder casing axially aligned with the screw conveyor and in longitudinal continuation of the screw conveyor, an outlet in the bottom of the shredder casing permitting flow of material from the shredder casing, a rotor having a hollow shaft with shredding arms thereon rotatably mounted in the casing, a shaft fixed to the screw conveyor and axially projecting therefrom through the hollow rotor shaft, the respective shafts projecting beyond the casing and having individual driving means connected thereto, whereby the shredder rotor and screw conveyor can be driven at different relative speeds.

6. A shredder and a feeder therefor as claimed in claim 5, wherein the outlet is a horizontal opening parallel to the shredder shaft and having sides diverging progressively from a narrow end adjacent the screw conveyor.

7. A shredder comprising, a cylindrical casing having one open end for admission of material endwise of the casing, a rotor having a shaft with shredder arms thereon positioned axially of the casing and mounted for rotation therein, and an outlet extending lengthwise of the casing at the bottom, the outlet being a horizontal opening having sides diverging progressively from a narrow end adjacent the casing open end.

8. A shredder as claimed in claim 7 wherein there is a baffle depending along the far side of the outlet opening in the direction of rotor rotation against which material acted upon by the rotor will be thrown, the baffle declining outwardly from the opening side to smoothly change the direction of material movement to direct the material downwardly.

References Cited in the file of this patent

UNITED STATES PATENTS

| 1,783,487 | Weiss | Dec. 2, 1930 |
| 2,757,049 | Temple | July 31, 1956 |

FOREIGN PATENTS

| 572,199 | Germany | Mar. 11, 1933 |